(12) United States Patent
Alsaadi et al.

(10) Patent No.: US 11,465,068 B2
(45) Date of Patent: Oct. 11, 2022

(54) MULTI-STAGE FLASH (MSF) REVERSAL SYSTEM AND METHOD

(71) Applicant: KING ABDULLAH UNIVERSITY OF SCIENCE AND TECHNOLOGY, Thuwal (SA)

(72) Inventors: Ahmad S. Alsaadi, Thuwal (SA); Noreddine Ghaffour, Thuwal (SA); Lijo Francis, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/254,963

(22) PCT Filed: Jun. 24, 2019

(86) PCT No.: PCT/IB2019/055309
§ 371 (c)(1),
(2) Date: Dec. 22, 2020

(87) PCT Pub. No.: WO2020/012273
PCT Pub. Date: Jan. 16, 2020

(65) Prior Publication Data
US 2021/0178281 A1 Jun. 17, 2021

Related U.S. Application Data

(60) Provisional application No. 62/695,410, filed on Jul. 9, 2018.

(51) Int. Cl.
*B01D 3/06* (2006.01)
*B01D 1/00* (2006.01)
(Continued)

(52) U.S. Cl.
CPC ........... *B01D 3/065* (2013.01); *B01D 1/0058* (2013.01); *B01D 3/42* (2013.01); *B01D 5/006* (2013.01);
(Continued)

(58) Field of Classification Search
CPC ...... B01D 1/0058; B01D 3/0065; B01D 3/42; B01D 5/006; B01D 5/0075; C02F 1/008;
(Continued)

(56) References Cited

U.S. PATENT DOCUMENTS 3,180,805 A * 4/1965 Chirico .................. B01D 3/065
202/173
3,420,747 A * 1/1969 Williamson ........... B01D 3/065
202/173

(Continued)

FOREIGN PATENT DOCUMENTS

GB       2413321 A       10/2005

OTHER PUBLICATIONS

Fath, Hassan et al. "Present and Future Trend in the Production and Energy Consumption of Desalinated Water in GCC Countries," International Journal of Thermal & Environmental Engineering, vol. 5, No. 2, 2013, pp. 155-165.
(Continued)

*Primary Examiner* — Jonathan Miller
(74) *Attorney, Agent, or Firm* — Patent Portfolio Builders PLLC (57) ABSTRACT

A multi-stage flash reversal unit includes a housing; plural stages located inside the housing; an evaporation port that receives a water feed having a first temperature; a condensation port that outputs a concentrated water feed having a second temperature, which is lower than the first temperature; and a cooling unit that cools down the concentrated water feed.

20 Claims, 4 Drawing Sheets

(51) Int. Cl.
*B01D 3/42* (2006.01)
*B01D 5/00* (2006.01)
*C02F 1/00* (2006.01)
*C02F 1/06* (2006.01)
*C02F 1/16* (2006.01)
*C02F 103/08* (2006.01)

(52) U.S. Cl.
CPC ............ B01D 5/0075 (2013.01); C02F 1/008 (2013.01); C02F 1/06 (2013.01); C02F 1/16 (2013.01); C02F 2103/08 (2013.01); C02F 2209/03 (2013.01); C02F 2301/08 (2013.01); C02F 2303/10 (2013.01)

(58) Field of Classification Search
CPC .......... C02F 1/06; C02F 1/16; C02F 2103/08; C02F 2209/03; C02F 2301/08; C02F 2303/10
See application file for complete search history.

(56) References Cited

U.S. PATENT DOCUMENTS

| | | | | |
|---|---|---|---|---|
| 3,442,765 A * | 5/1969 | Levite | ................... | B01D 3/065 202/173 |
| 3,691,020 A * | 9/1972 | Hughes | ................. | B01D 3/065 203/25 |
| 3,844,899 A * | 10/1974 | Sager, Jr. | ................ | C02F 1/06 202/173 |
| 3,871,968 A * | 3/1975 | Wood | ........................ | C02F 1/04 202/173 |
| 3,941,663 A * | 3/1976 | Steinbruchel | ............ | B01D 1/26 202/174 |
| 3,966,562 A * | 6/1976 | Mukushi | .................. | C02F 1/06 202/173 |
| 4,330,373 A * | 5/1982 | Liu | ........................ | B01D 3/065 202/174 |
| 4,376,679 A * | 3/1983 | Liu | ........................... | C02F 1/14 203/71 |
| 8,277,614 B2 * | 10/2012 | Alhazmy | ................. | B01D 1/26 202/173 |
| 9,309,129 B1 * | 4/2016 | Zeitoun | .................. | B01D 1/26 |
| 9,393,502 B1 * | 7/2016 | Zeitoun | .................. | B01D 3/065 |
| 9,539,522 B1 * | 1/2017 | El-Sayed | ................. | C02F 1/06 |
| 10,099,154 B2 * | 10/2018 | Zeitoun | .................... | B01D 1/26 |
| 2010/0078306 A1 * | 4/2010 | Alhazmy | ................. | B01D 1/26 203/10 |
| 2013/0168224 A1 * | 7/2013 | Godshall | ................... | C02F 1/14 203/10 |
| 2016/0288012 A1 * | 10/2016 | Zeitoun | ................ | B01D 1/2812 |
| 2017/0151507 A1 * | 6/2017 | El-Sayed | ............. | B01D 61/027 |
| 2018/0154277 A1 * | 6/2018 | Alt | ............................ | C02F 1/06 |

OTHER PUBLICATIONS

International Search Report in corresponding/related International Application No. PCT/IB2019/055309, dated Nov. 27, 2019.
Written Opinion of the International Searching Authority in corresponding/related International Application No. PCT/B2019/055309, dated Nov. 27, 2019.

* cited by examiner

MULTI-STAGE FLASH (MSF) REVERSAL SYSTEM AND METHOD

CROSS-REFERENCE TO RELATED APPLICATIONS

This application is a U.S. National Stage Application of International Application No. PCT/IB2019/055309, filed on Jun. 24, 2019, which claims priority to U.S. Provisional Patent Application No. 62/695,410, filed on Jul. 9, 2018, entitled "MULTI-STAGE FLASH (MSF) REVERSAL SYSTEM AND METHOD," the disclosures of which are incorporated herein by reference in their entirety.

BACKGROUND

Technical Field

Embodiments of the subject matter disclosed herein generally relate to methods and devices for separating water from a water feed, and more specifically, to seawater desalination technologies.

Discussion of the Background

There are currently two general categories of seawater desalinations technologies: thermal-based and membrane-based processes.

Thermal-based desalination separates water from its impurities through evaporation and condensation. This type of desalination is the dominating technology in many countries (for example, in the Gulf countries) due to the availability of oil at low price and due to the poor and unsuitable seawater quality for the other technology, which is usually described by the 4H: High salinity, High temperature, High turbidity and High marine life. The thermal processes used for water desalination can also be divided into three main types based on their popularity as large-scale units: multi-stage flash (MSF), multi-effect distillation (MED), and vapor compression (VC), thermal or mechanical (TVC or MVC).

The former type (MSF) is the most dominant technology in the Gulf region and ranked the second after reverse osmosis (RO) globally. The MSF technology is simple, easy to operate and maintain, and reliable. This technology is considered today as the leader desalination technology in terms of unit capacity.

Figure 1:
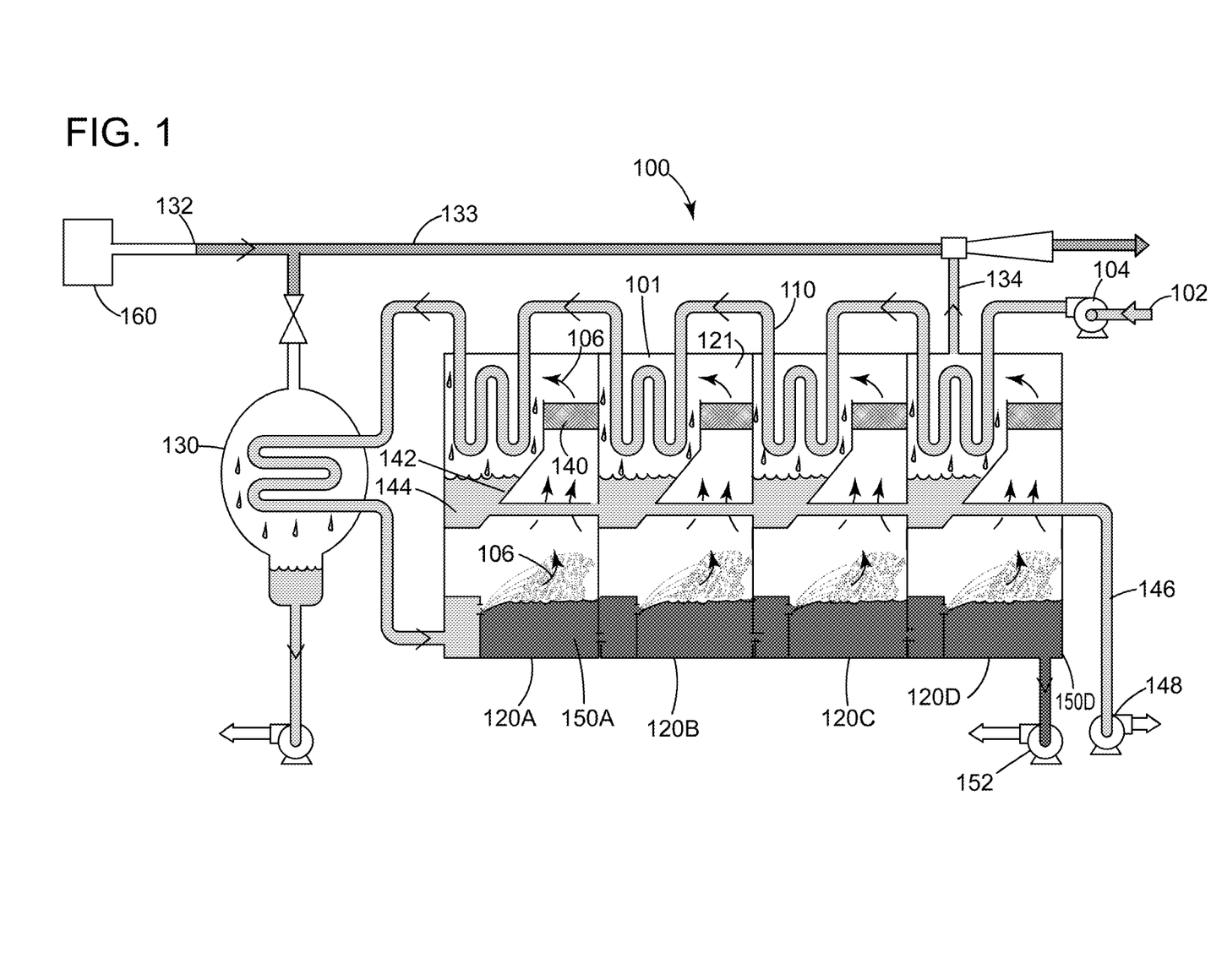
FIG. 1 illustrates a unit for generating distilled water by evaporation.

An MSF unit 100 is shown in FIG. 1. An MSF process is discussed with regard to FIG. 1. A water feed 102 (e.g., seawater) is first de-aerated before entering the MSF unit 100. The water feed 102 is then pumped by a feedwater pump 104 to a condenser 110 (tubes of heat exchangers) installed at the top of the MSF unit 100. Note that the water feed is at an ambient temperature when entering the MSF unit. While flowing inside the tubes of the heat exchangers, the water feed 102 recovers the heat (using the latent heat) from the vapor 106 produced in each stage 120A to 120D (only four stages shown in FIG. 1), when it condenses on the outer surface of the tubes 110.

Throughout the MSF stages 120, the water feed's temperature increases from the ambient temperature, at the pump 104, to the inlet temperature of the brine heater 130. The brine heater 130 is an external heat source provided mainly by low-pressure steam 132 from a power plant. In the brine heater 130, the water feed's temperature is further increased, for example, by about 10° C., to reach the required top brine temperature (TBT). In the MSF application, the TBT may be between 90 to 120° C. The water feed at the top brine temperature is then fed into the first stage 120A. Note that the steam 132 is used to reduce the boiling temperature of the water inside each stage (see connection 134 between the steam pipe 133 and the housing 101 of the MSF unit 100).

The water feed enters the first stage 120A overheated compared to the temperature and pressure conditions around the condenser part 110. Because of this difference of temperature and pressure, the water feed immediately flashes into vapor 106. The produced vapor 106 passes through a demister device 140 (e.g., a mesh of wires of 10 cm thickness), installed at the top of the chamber 121 to remove any water droplets transported with the vapor. Vapor 106 reaches the tubes 110 and condenses on the tubes of the heat exchanger at the top of each stage before it gets collected in the product trays 142 as distilled water 144. The product trays 142 are fluidly connected to a pipe 146 that takes the distilled water to a pump 148. The distilled water is then pumped to a storage tank. The remaining of the water feed, which is now a brine 150A, is moved to the next stage 120B, at a lower temperature to further generate vapors and distilled water. This process is repeated until the water feed 150D exits the last stage 120D as concentrated brine. The concentrated brine is pumped with a brine pump 152 to another unit or discharged.

The pressure inside the distillers is adjusted using venting lines, connected to a vacuum system 133, installed inside each distiller to match the saturation pressure at that specific temperature and to maximize the flashing process in each distiller. In MSF-brine recirculation design, part of the brine is mixed with feed seawater (after de-aeration) in a brine pool after flowing through the condensers of the last 3 or 4 stages of the brine recirculation system in order to recover the heat before it (mixed feed) flows into the remaining condensers stages.

The MSF unit 100 can tolerate different salinity and quality of seawater and does not require extensive pretreatment. The MSF process is thermally efficient if it is coupled with an electrical power generation plant (co-generation). However, the MSF process is energy intensive because the water has a high specific heat. Thus, coupling the MSF process with a steam turbine generating station 160 in a "dual purpose plant" is required to improve its thermal efficiency. Furthermore, the current MSF design relies on the availability of low-pressure steam to run the process. Such a design limits the process' feasibility to sites having low-pressure steam and makes the process unsustainable.

Accordingly, there is a need to provide an MSF unit that overcomes the aforementioned deficiencies and can operate without a steam source.

SUMMARY

According to an embodiment, there is a multi-stage flash reversal unit that includes a housing, plural stages located inside the housing, an evaporation port that receives a water feed having a first temperature, a condensation port that outputs a concentrated water feed having a second temperature, which is lower than the first temperature, and a cooling unit that cools down the concentrated water feed.

According to another embodiment, there is a method for producing distilled water with a multi-stage flash, MSF, reversal unit, the method including a step of providing a water feed, having a first temperature, to an evaporation part of the MSF reversal unit, a step of flash evaporating an amount of water from the water feed in the evaporation part, to obtain vapors and concentrated water feed, a step of cooling down the concentrated water feed in a cooling unit, wherein the cooling unit lowers a temperature with a given temperature interval, a step of providing the cooled, concentrated, water feed to a condensation part of the MSF reversal unit, a step of producing the distilled water by condensating the vapor in the condensation part, and a step of outputting the concentrated water feed at a second temperature, which is lower than the first temperature.

According to yet another embodiment, there is a multi-stage flash reversal unit that includes an evaporation part that receives a water feed having a first temperature and flash evaporates water from the water feed to form vapors; a condensation part that condensates the vapors to generate distilled water, and outputs a concentrated water feed having a second temperature, which is lower than the first temperature; and a cooling unit that cools down the concentrated water feed.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an MSF reversal unit having 13 stages. However, the invention is not limited to this unit, but it may be used with other MSF units have more or less stages.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, an MSF reversal unit uses a hot water feed for desalinization purposes. This unit does not use a brine heater, as the traditional MSF units do. Instead, the novel MSF reversal unit uses a cooling medium for cooling the water feed. For these reasons, no source of low-pressure steam is necessary as in the traditional units. In addition, this MSF reversal unit may be used as a standalone unit, i.e., independent of a power plant.

Figure 2:
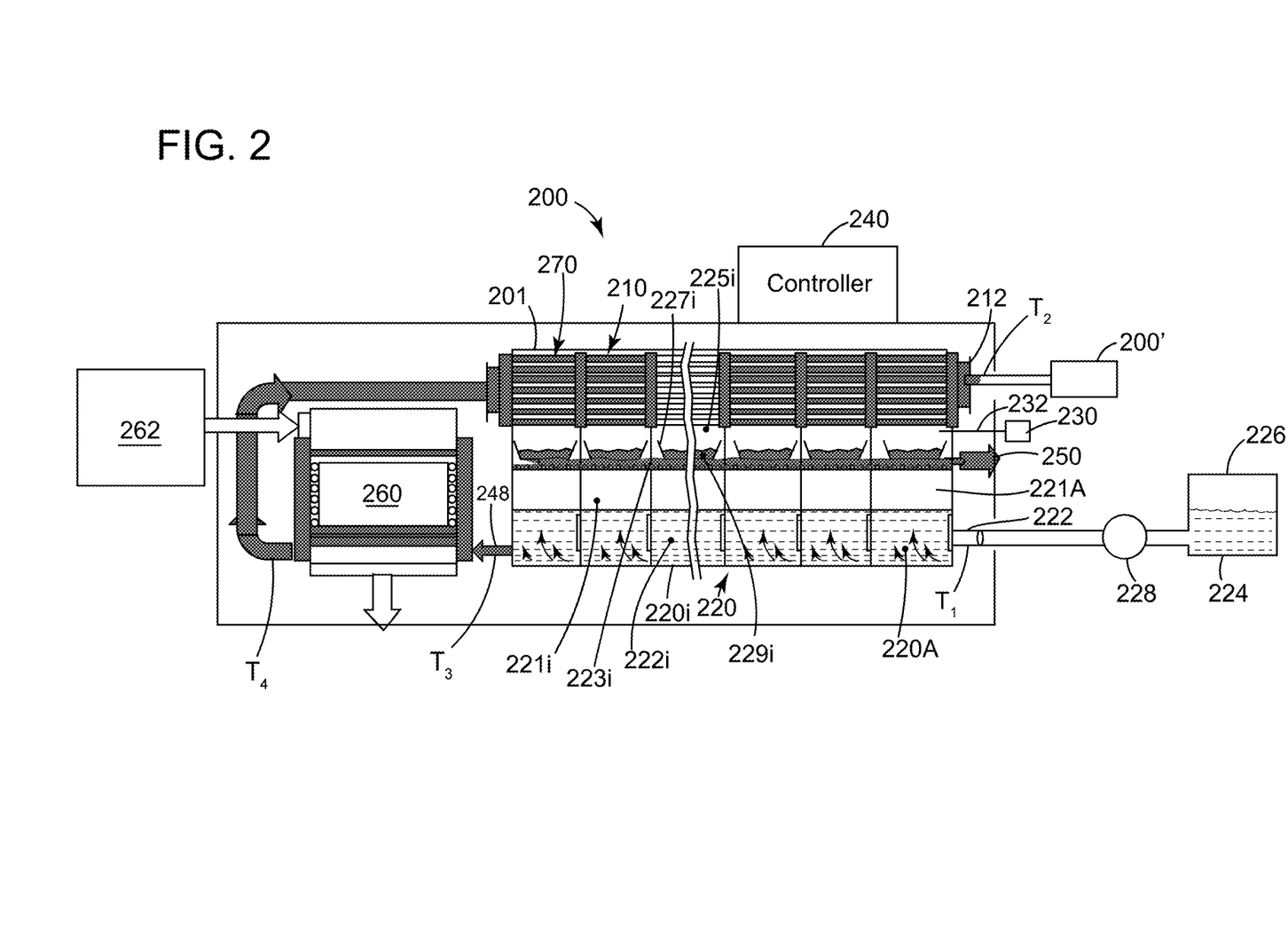
FIG. 2 shows a multi-stage flash reversal unit that generates distilled water.

More specifically, as illustrated in FIG. 2, the novel MSF reversal unit 200 has a housing 201 that hosts a condenser part 210 (e.g., plural condensing pipes) in which water vapors are condensed and an evaporation part 220 in which water vapors are formed. This new structure of the MSF reversal unit allows the MSF process to treat a hot water source (e.g., from a hot spring, power plant, solar farm, geothermal water, industrial wastewater, etc.) having a first temperature T1 about the TBT (e.g., in the range of 90-120° C. or more or less), without the need for an external heat source or the need of a brine heater device 130 as for the unit 100 in FIG. 1.

The new MSF process reverses the input of the water feed from the condensation port 212 (as it is the case for traditional MSF) to the evaporation port 222 as now discussed. According to this embodiment, the water feed 224, which may be stored in a storage tank 226, is pumped, for example, with evaporation pump 228 to evaporation port 222 at the first temperature T1. Evaporation port 222 is in fluid communication with the first stage 220A of the evaporation part 220 of the MSF reversal unit 200. MSF reversal unit 200 is shown in FIG. 2 having 13 stages. One skilled in the art would understand that any number of stages may be present. Because the water feed 224 is provided to the MSF reversal unit at the evaporation port 222 and not at the condensation port 212, as in the traditional designs, the present MSF process is called MSF reversal process. The water feed 224 has a higher temperature when provided at the evaporation port 222 then when the corresponding concentrated water feed exits at the condensation port 212 having a second temperature T2. The lower temperature of the concentrated water feed is due to the evaporation processes that take place in the evaporation part 220 and also due to a cooling unit that further cools the concentrated water feed, between the evaporation part and the condensation part, as discussed later.

The hot water feed 224 of the MSF reversal process may originate from one of thermal brines, power plant condensers, boilers blow-down, hot or geothermal springs, wastewater of incinerators etc. The hot water feed 224 enters through the evaporation port 222 into the first stage 220A and starts to flash evaporate inside the first stage 220A because of the temperature difference between the hot water feed and the interior of the flash chamber 221A. Flash evaporation is the partial vapor that occurs when a saturated liquid stream undergoes a reduction in pressure by passing through a given path. Note that each stage 220$i$ includes a corresponding flash chamber 221$i$, a water barrier 223$i$ that allows only the generated vapor 225$i$ to pass through, and a collection pan 227$i$ for collecting the water droplets that result from the condensation of the vapor 225$i$ on the condenser tubes 210. The water feed 224 is hold into a brine pool 222$i$, which is located at the bottom of the flash chamber 221$i$. The evaporation process of the hot water feed 224 is controlled not only by the temperature difference between the water feed and the ambient in the flash chamber 221A, but also by a vacuum applied to the flash chamber 221A. FIG. 2 shows a vacuum pump 230 that fluidly communicates through a pipe 232 to the interior of the flash chamber 221A. Although the figure shows the pipe communicating only with the flash chamber 221A, in an actual implementation of this unit, the pipe 232 may be in fluid communication with each flash chamber 221$i$.

The temperature difference and the pressure noted above may be controlled by a controller 240 that is connected to the various pumps. Due to the temperature difference and the low pressure, the hot water feed 224 partially evaporates in the flash chamber 220$i$. The corresponding vapors 225$i$ pass through the liquid barrier 223$i$ (or demister) and move to the upper part (the condensing part) of the chamber. Here, as discussed above, the vapor interacts with the colder pipes 210 and condensate, forming the distilled water 229$i$. Note that the condensing pipes 210 extend in the condensing part of each stage. The distilled water 229$i$ is collected inside the pan 227$i$, and from here the distilled water 229$i$ is flowing to the water output 250, where the water is collected for usage.

After losing some mass due to the evaporation, and its temperature drops, the water feed 224 enters the next stage's brine pool, where the pressure inside the flash chamber is adjusted to be slightly lower than the saturation pressure of the water feed's temperature, to generate further water vapor. The water feed continues its flow in a similar manner from one stage to the next one until it exits the last stage. To ensure a constant temperature difference between the evaporation part 220 and the condensation part 270 for each stage, the water feed's temperature, when exiting the last stage, is further cooled from a third temperature T3, which is smaller than the first temperature T1, to a fourth temperature T4, by a certain temperature difference (T4–T3), e.g., 3-7° C., in a heat exchanger unit 260 using a cooling medium 262 such as ambient seawater, cold water from a cooling tower or air-fan cooler. At this stage, as a certain percent of the water from the water feed has been evaporated and transformed into distilled water 229$i$, the remaining water feed is more concentrated in terms of salt, and for this reason, the water feed when exiting the last stage is called concentrated water feed 248. After the concentrated water feed 248 is cooled to temperature T4, it enters the condenser tubes 210 of the last stage and acts as a coolant to recover the latent heat of the vapor 225$i$ that condenses on the condensation surface of condenser tubes 210.

Then, the concentrated water feed 248 flows to the next stage (from left to right in FIG. 2) to recover more energy at the condensation part 270 of each stage in a similar manner as discussed above. After the concentrated water feed exits at the condensation port 212, it may be mixed with a fresh hot water feed, which is received from the original source, to increase its temperature so that the new water feed may be passed to another MSF reversal unit 200' or to another process which could run with a feed water having a lower temperature, e.g., a membrane distillation unit. The number of MSF reversal units/processes connected in series depends on the temperature of the brine (concentrated water feed) discharged from the last unit/process, which in turn depends on the temperature of the available hot water feed (a sufficient ΔT is required to drive the process).

The maximum distillate production from the MSF reversal unit 200 (the product obtained from pipe 232 is distilled water quality as pure vapor is condensed in the condensation part 270 of each stage) depends on (1) the temperature difference between the hot water feed that enters the first stage and the concentrated water feed' temperature that exits the MSF unit at port 212 and (2) the water feed flow rate that enters the evaporation section of each process. The water feed flow rate is given by equation:

$$M_D = \frac{M_{F1}(T_{F1} - T_{B1})}{\left(\frac{h_g}{C_p} - T_{B2}\right)} + \frac{M_{F2}(T_{F2} - T_{B2})}{\left(\frac{h_g}{C_p} - T_{B2}\right)} + \ldots + \frac{M_{Fn}(T_{Fn} - T_{Bn})}{\left(\frac{h_g}{C_p} - T_{Bn}\right)}$$

where $M_D$ and $M_{Fi}$ are the mass flow rates of the distillate and the hot water feed, respectively, $T_{Fi}$ and $T_{Bi}$ are the temperatures of the hot water feed that enters the first stage and exits the last stage, respectively, and $h_g$ and $C_p$ are the average enthalpy of the generated water vapor and the average specific heat of the water feed, respectively.

Additionally, the concentrated water feed leaving the MSF reversal unit 200 can be fed to any desalination process, such as membrane distillation or other thermal process because the hot water feed's temperature leaving the MSF reversal unit (from condensers) is high enough (few degrees less than TBT) to run multiple units of MD processes.

Figure 3:
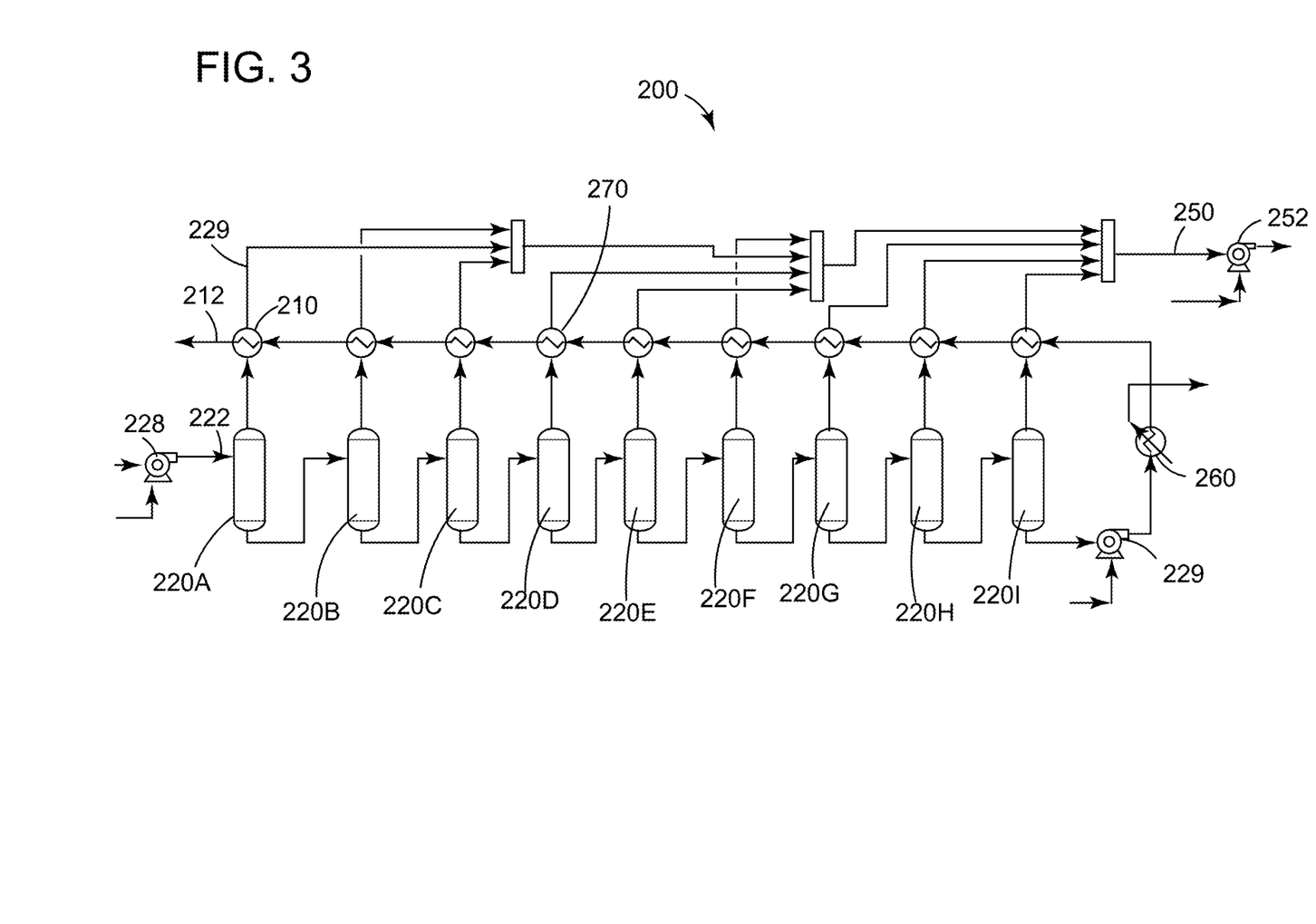
FIG. 3 shows a schematic of a multi-stage flash reversal unit.

FIG. 3 shows a schematic of the MSF reversal unit 200 that illustrates the paths followed by the water feed. MSF reversal unit 200 includes, in this embodiment, 13 stages 220A to 220I. The water feed follow the paths marked L1 to L21 from evaporation port 222 to condensation port 212. A feed pump 228 pumps the water feed through the MSF reversal unit 200. FIG. 3 also shows a cooler pump 229, at the exit from stage 220I and before the heat exchanger unit 260. Heat exchanger unit 260 is shown in the figure as removing heat Q1 from the concentrated water feed. The heat exchanger unit uses the heat medium 262 for cooling the concentrated water feed. After the concentrated water feed has moved through the condensation part 270 of each stage, along the path L12 to L21, the distilled water 229 is collected at water output 250 and pumped by water pump 252 to a storage tank (not shown).

Figure 4:
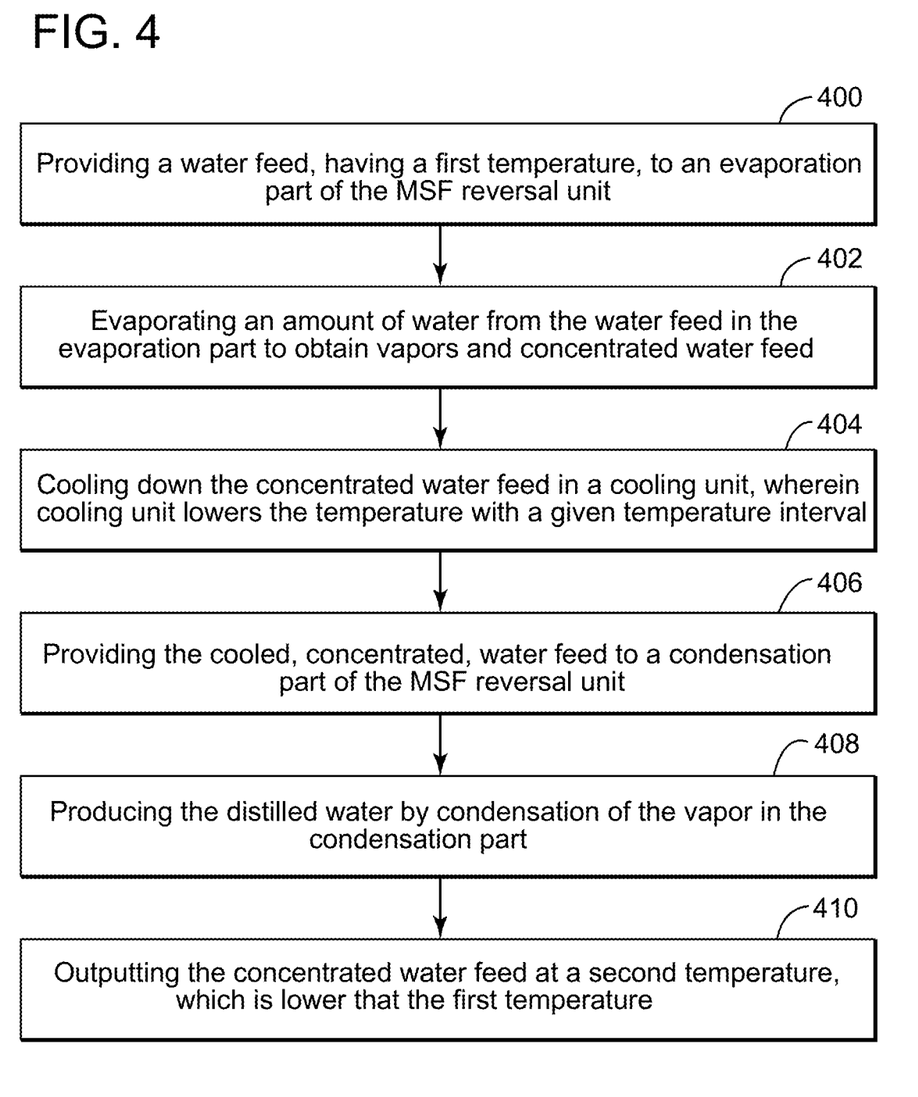
FIG. 4 is a flowchart of a method for generating distilled water with a multi-stage flash reversal unit.

A method for water desalination that uses the MSF reversed process and the MSF reverse unit 200 is now discussed with regard to FIG. 4. The method includes a step 400 of providing a water feed (224), having a first temperature, to an evaporation part (222) of the MSF reversal unit (200), a step 402 of evaporating an amount of water from the water feed (224) in the evaporation part (220), to obtain vapors and concentrated water feed, a step 404 of cooling down the concentrated water feed in a cooling unit (260), wherein cooling unit lowers the temperature with a given temperature interval, a step 406 of providing the cooled, concentrated, water feed to a condensation part (270) of the MSF reversal unit (200), a step 408 of producing the distilled water by condensation of the vapor in the condensation part (270), and a step 410 of outputting the concentrated water feed at a second temperature, which is lower than the first temperature.

The temperature interval may be between 5 and 10° C. In one application, the water feed is heated (e.g., by natural means) prior to being provided to the MSF reversal unit. As discussed above, the MSF reversal unit has plural stages and evaporation and condensation processes happens in each stage. In an embodiment, the first temperature of the water feed drops after each stage of the MSF reversal unit. The cooling unit only cools and cannot heat the water feed. The cooling unit is fluidly connected between the evaporation part and the condensation part of the MSF flash unit. In one embodiment, the water feed is provided to an evaporation port that is in fluid communication with a brine pool and the concentrated water feed is output at a condensation port that is in fluid communication with condensation pipes. The method further includes a step of controlling a pressure inside each stage to evaporate the water.

The disclosed embodiments provide methods and devices that evaporate water from a hot water feed and generate distilled water. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A multi-stage flash reversal unit comprising:
a housing;
plural stages located inside the housing;
an evaporation port that receives a water feed having a first temperature;
a condensation port that outputs a concentrated water feed having a second temperature, which is lower than the first temperature; and
a cooling unit that cools down the concentrated water feed,
wherein the evaporation port and the condensation port are arranged within the housing so that the water feed enters first the evaporation port when the water feed first enters the housing, and the concentrated water feed exits the condensation port last when leaving the housing.

2. The unit of claim 1, wherein each stage comprises:
a flash chamber in which the water feed is evaporated;
a brine pool that holds the water feed;
a water barrier placed in the flash chamber and configured to allow only vapor to pass through; and
a tray that collects distilled water.

3. The unit of claim 2, further comprising:
condensing pipes that extend in each stage of the plural stages.

4. The unit of claim 3, wherein the water feed partially evaporates in the flash chamber of the first stage, and the vapor, after passing through the water barrier, condenses on the condensing pipes.

5. The unit of claim 1, further comprising:
a controller that controls a pressure inside each stage so that the water feed partially evaporates in each stage.

6. The unit of claim 1, wherein each stage is in fluid communication with a next stage, and the water feed is pumped from one stage to another until all the stages are used and the water feed has become the concentrated water feed.

7. The unit of claim 1, wherein the cooling unit receives the concentrated water feed at a third temperature, cools down the concentrated water feed to a fourth temperature, and provides the concentrated water feed at the fourth temperature to a condensing part of each the plural stages.

8. The unit of claim 7, wherein the concentrated water feed is heated in the condensation part of each of the plural stages by vapors from each of the plural stages.

9. A method for producing distilled water with a multi-stage flash, MSF, reversal unit, the method comprising:

providing a water feed, having a first temperature, to an evaporation part of the MSF reversal unit;
flash evaporating an amount of water from the water feed in the evaporation part, to obtain vapors and a concentrated water feed;
cooling down the concentrated water feed in a cooling unit, wherein the cooling unit lowers a temperature with a given temperature interval;
providing the cooled, concentrated, water feed to a condensation part of the MSF reversal unit;
producing the distilled water by condensating the vapors in the condensation part; and
outputting the concentrated water feed at a second temperature, which is lower than the first temperature,
wherein an evaporation port that receives the water feed and a condensation port that expels the concentrated water feed are arranged within a housing of the MSF reversal unit so that the water feed enters first the evaporation port when the water feed first enters the housing, and the concentrated water feed exits the condensation port last when leaving the housing.

10. The method of claim 9, where the temperature interval is between 5 and 10° C.

11. The method of claim 9, wherein the water feed is heated prior to being provided to the MSF reversal unit.

12. The method of claim 9, wherein the MSF reversal unit has plural stages and evaporation process and condensation processes take place in each stage.

13. The method of claim 12, wherein the first temperature of the water feed drops after each stage of the MSF reversal unit.

14. The method of claim 9, wherein the cooling unit only cools and does not heat the water feed.

15. The method of claim 9, wherein the cooling unit is fluidly connected between the evaporation part and the condensation part of the MSF reversal unit.

16. The method of claim 9, wherein the water feed is provided to an evaporation port that is in fluid communication with a brine pool and the concentrated water feed is output at a condensation port that is in fluid communication with condensation pipes.

17. The method of claim 9, further comprising:
controlling a pressure inside each stage to flash evaporate the water.

18. A multi-stage flash reversal unit comprising:
an evaporation part that receives, at an evaporation port of a housing, a water feed having a first temperature and flash evaporates water from the water feed to form vapors;
a condensation part that condensates the vapors to generate distilled water, and outputs a concentrated water feed having a second temperature, which is lower than the first temperature, at a condensation port of the housing; and
a cooling unit that cools down the concentrated water feed,
wherein the evaporation port and the condensation port are arranged within the housing so that the water feed enters first the evaporation port when the water feed first enters the housing, and the concentrated water feed exits the condensation port last when leaving the housing.

19. The unit of claim 18, wherein the water feed partially evaporates in flash chambers corresponding to plural stages of the unit, and the vapors, after passing through corresponding water barriers inside each stage, condense on condensing pipes that hold the concentrated water feed.

20. The unit of claim 18, wherein the cooling unit receives the concentrated water feed at a third temperature, lower than the first temperature, cools down the concentrated water feed to a fourth temperature, and provides the concentrated water feed at the fourth temperature to the condensation part.

* * * * *